United States Patent
Illan et al.

(10) Patent No.: US 11,178,736 B2
(45) Date of Patent: Nov. 16, 2021

(54) ELECTRONIC ASSEMBLY, LIGHTING DEVICE AND METHOD FOR MANUFACTURING A LIGHTING DEVICE

(71) Applicant: Valeo Vision, Bobigny (FR)

(72) Inventors: Antonio Domingo Illan, Martos (ES); Juan-Jose Santaella, Martos (ES); Juan Lara-Cabeza, Martos (ES); Miguel-Angel Pena, Martos (ES); Antonio Calavia, Martos (ES)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 17/047,745

(22) PCT Filed: Apr. 26, 2019

(86) PCT No.: PCT/EP2019/060799
§ 371 (c)(1),
(2) Date: Oct. 15, 2020

(87) PCT Pub. No.: WO2019/207135
PCT Pub. Date: Oct. 31, 2019

(65) Prior Publication Data
US 2021/0162911 A1 Jun. 3, 2021

(30) Foreign Application Priority Data
Apr. 27, 2018 (EP) .................................. 18382296

(51) Int. Cl.
*H05B 45/00* (2020.01)
*F21S 41/19* (2018.01)
(Continued)

(52) U.S. Cl.
CPC ........... *H05B 45/00* (2020.01); *B60Q 1/0088* (2013.01); *B60Q 1/2696* (2013.01); *F21S 41/192* (2018.01)

(58) Field of Classification Search
CPC .... B60Q 1/0088; B60Q 1/2696; F21S 41/192
(Continued)

(56) References Cited

U.S. PATENT DOCUMENTS 5,841,203 A * 11/1998 Chambers ............ B60Q 1/0088
307/10.8
6,431,728 B1 * 8/2002 Fredericks ........... B60Q 1/2696
340/901
(Continued)

FOREIGN PATENT DOCUMENTS

EP 2348792 A2 7/2011

OTHER PUBLICATIONS

European Patent Office, Extended European Search Report of corresponding European Application No. 18382296.4, dated Oct. 18, 2018.
(Continued)

*Primary Examiner* — Bryon T Gyllstrom
(74) *Attorney, Agent, or Firm* — Valeo Vision

(57) ABSTRACT

The invention relates to an electronic assembly for an automotive lighting device. The inventive electronic assembly comprises a first group of light source connections and at least one jumper where each jumper is arranged to bypass a first spare light source connection belonging to the first group of light source connections by putting its first and second terminals in electrical contact. Hence when in operation, the first spare light source connection does not receive any light source. The first group of light source connections are intended to receive light sources which are used for the same lighting function. The invention also relates to a lighting device that includes such an electronic assembly with a method that includes manufacturing such a lighting device.

13 Claims, 2 Drawing Sheets

(51) Int. Cl.
*B60Q 1/00* (2006.01)
*B60Q 1/26* (2006.01)

(58) Field of Classification Search
USPC .......................................................... 362/459
See application file for complete search history.

(56) References Cited

U.S. PATENT DOCUMENTS

| | | | | |
|---|---|---|---|---|
| 8,297,791 B2* | 10/2012 | Kuang | ................... | H05B 45/48 |
| | | | | 362/249.02 |
| 2001/0007526 A1* | 7/2001 | Ohkohdo | ............. | H01R 4/2454 |
| | | | | 362/249.01 |
| 2003/0102819 A1* | 6/2003 | Min | ......................... | B60Q 1/44 |
| | | | | 315/291 |
| 2009/0040780 A1* | 2/2009 | Menze | ................. | B60Q 1/0088 |
| | | | | 362/543 |
| 2012/0299476 A1* | 11/2012 | Roberts | ................ | B60Q 1/2607 |
| | | | | 315/77 |
| 2012/0328299 A1* | 12/2012 | Pickard | ................ | H04B 10/116 |
| | | | | 398/106 |
| 2018/0215306 A1* | 8/2018 | Sugimoto | .............. | H05B 45/00 |
| 2018/0264992 A1* | 9/2018 | Calavia | ................. | H05B 45/14 |

OTHER PUBLICATIONS

European Patent Office, International Search Report and Written Opinion of corresponding International Application No. PCT/EP2019/060799, dated Jun. 14, 2019.

* cited by examiner

ELECTRONIC ASSEMBLY, LIGHTING DEVICE AND METHOD FOR MANUFACTURING A LIGHTING DEVICE

CROSS-REFERENCE TO RELATED APPLICATIONS

This application is filed under 35 U.S.C. § 371 U.S. National Phase of International Application No. PCT/EP2019/060799 filed Apr. 26, 2019, (published as WO2019207135), which claims foreign priority benefit to European Application No. EP18382296.4 filed Apr. 27, 2018, the disclosures of which are incorporated by reference herein by their entirety.

TECHNICAL FIELD

This invention belongs to the field of lighting devices installed in automotive vehicles, and more specifically to the electronic assemblies used in these automotive lighting devices.

BACKGROUND

Lighting devices installed in automotive vehicles usually comprise light sources mounted on a printed circuit board (PCB). However in some cases, these light sources provide a luminous flux which depends on manufacturing conditions. To minimize the effects of these differences, light sources are often classified in different bins or brightness classes. A bin should be understood to be interpreted as a group such that all the light sources belonging to the associated bin provide a luminous feature (flux, color, etc.) comprised within a tight interval.

While manufacturing processes develop, bin classifications may change and new flux values may be obtained. When a group of light sources is used for the same lighting functionality and an improved bin is available, it may happen that the required flux may be obtained by feeding the lighting devices at a lower intensity, and that bin resistor requires replacement. As a consequence, power consumption and heat are lowered.

However, the cost of manufacturing the lighting device is not altered.

SUMMARY

In an inventive aspect, the invention provides an electronic assembly for an automotive lighting device, the electronic assembly comprising
a first group of light source connections, each light source connection belonging to the first group comprising a first terminal and a second terminal and being suitable for receiving a light source, wherein at least one of the light source connections of the first group is a spare light source connection;
at least one jumper, each jumper comprising a conductive element arranged to bypass the first spare light source connection by putting the first and second terminals of the first spare light source connection in electric contact, the first spare light source connection, being deprived of any light source;
wherein the first group of light source connections are designed to receive light sources which are used for the same lighting function.

This electronic device comprises a plurality of light source connections, all of them being designed to receive a light source. But one of these light source connections, called the first spare light source connections, is by-passed by a jumper, thus providing a way of keeping the total flux of the light sources constant when light sources of a higher bin are installed. If n light sources provide a required flux, n−1 light sources of a higher bin would provide an equivalent flux. The aim is achieving a similar value of total flux with a different number of light sources, depending on the bin which they are classified in. The electronic assembly design is therefore useful for different generations of the product. When light sources of a higher bin are installed, there is no need to change anything in the circuit, but just activating a jumper and not installing a light source in this light source connection.

A bin is a concept which is well known in this technical field. It is a classification of light sources attending to a particular feature: there are colour bins, flux bins, voltage bins, etc. All the light sources belonging to a particular bin are supposed to provide this feature in a particular range, e. g., all the light sources classified in the flux bin 3F provide a flux comprised between 900 and 950 lm when fed with an intensity of 1A.

The light source connection is suitable for receiving a light source in the sense of its geometrical design, which ensures an electrical connection and thermal dissipation inside the tolerances required by the application for every working condition.

The first group of light source connections are designed to receive light sources which are used for the same lighting function, so they are placed close enough to each other, so that if one or more light sources are missing, homogeneity of the resulting group of light sources will not be affected.

In some particular embodiments, the first group of light source connections are physically arranged in a matrix arrangement.

This arrangement means that light source connections are arranged following a perpendicular system of rows and columns, so that each light source connection belongs to a row and a column, and has at least another light source connection in the same row and another light source connection in the same column. This arrangement is particularly advantageous for many lighting functionalities where a high luminous density is required.

In some particular embodiments, the first group of light source connections are connected in series. This arrangement is advantageously chosen for feeding a group of light sources with constant intensity.

In some particular embodiments, the first group of light source connections further comprises a second spare light source connection and the electronic assembly comprises a second jumper, the second jumper comprising a conductive element arranged to bypass the second spare light source connection by putting the first and second terminals of the second spare light source connection in electric contact.

This embodiment is particularly useful when the bin improvement is such that the lighting functionality may be obtained with more than one light source less than in the original design.

In some particular embodiments, the electronic assembly further comprises a second group of light source connections, with a third jumper arranged to bypass a third spare light source connection belonging to the second group of light source connections.

The electronic device of the invention is also suitable for being installed in lighting devices where two independent circuits are used for different lighting functionalities. In this second lighting functionality, the same problem may arise, and the electronic device of the invention also provides a solution for this case.

In some particular embodiments, the electronic assembly does not comprise a binning resistor.

When all the light sources are comprised in the same bin, there is no need to use a binning resistor. This is particularly advantageous, since there is no need to replace the bin resistor when the light sources are replaced by other ones belonging to a different bin.

In some particular embodiments, the light sources are solid-state light sources, such as light emitting diodes (LEDs).

The term "solid state" refers to light emitted by solid-state electroluminescence, which uses semiconductors to convert electricity into light. Compared to incandescent lighting, solid state lighting creates visible light with reduced heat generation and less energy dissipation. The typically small mass of a solid-state electronic lighting device provides for greater resistance to shock and vibration compared to brittle glass tubes/bulbs and long, thin filament wires. They also eliminate filament evaporation, potentially increasing the life span of the illumination device. Some examples of these types of lighting comprise semiconductor light-emitting diodes (LEDs), organic light-emitting diodes (OLED), or polymer light-emitting diodes (PLED) as sources of illumination rather than electrical filaments, plasma or gas.

In a further inventive aspect, the invention provides a lighting device comprising
an electronic assembly according to the previous inventive aspect; and
a plurality of light sources installed in some of the light source connections of the first group of light source connections.

This lighting device is particularly useful in automotive applications, for lighting functionalities where a plurality of light sources are needed to provide a required flux amount.

In some particular embodiments, the lighting device further comprises a first optical element arranged to receive light from the plurality of light sources and to shape the light into a light pattern projected outside the lighting device.

An optical element is an element that has some optical properties to receive a light beam and emit it in a certain direction and/or shape, as a person skilled in automotive lighting would construe without any additional burden.

In some particular embodiments, the optical element is at least one of a light guide, a lens, a reflector or a collimator.

These optical elements are useful to manage the flux produced by the plurality of light sources and provide uniform output.

In some particular embodiments, all the light sources installed in light source connections of the first group belong to the same flux bin or produce a luminous flux, in operation conditions, which is comprised between two values l1 and l2, in such a way that l2 is greater than l1 and lower than 1.1 times l1.

When all the light sources belong to the same flux bin, the feeding voltage may be uniform, without the need of bin resistors. Further, the flux amount is more easily calculable, and the design may be optimized for these light sources.

In some particular embodiments, the lighting device is a fog lamp, a turning indicator, a low beam headlamp, a high beam headlamp, a cornering light, a fixed bending light or a daytime running lamp.

These lighting functionalities are typical to use a group of light sources to provide the required amount of flux.

In a further inventive aspect, the invention provides a method for manufacturing a lighting device according to the previous inventive aspect, the method comprising the steps of
choosing a predetermined flux bin
calculating a first number of light sources which are necessary to meet luminous requirements provided all the light sources belong to the predetermined flux bin
manufacturing an electronic assembly according to the first inventive aspect, installing only the first number of light sources in light source connections of the first group and placing jumpers in the rest of the light source connections of the first group.

This method may be used to design different generation of the same lighting device. If in a later step of the product the lighting sources of this electronic assembly are replaced by other light sources belonging to a higher bin, more jumpers will be used and less light sources will be installed, but the rest of the lighting device will remain the same.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures.

DETAILED DESCRIPTION

Figure 1:
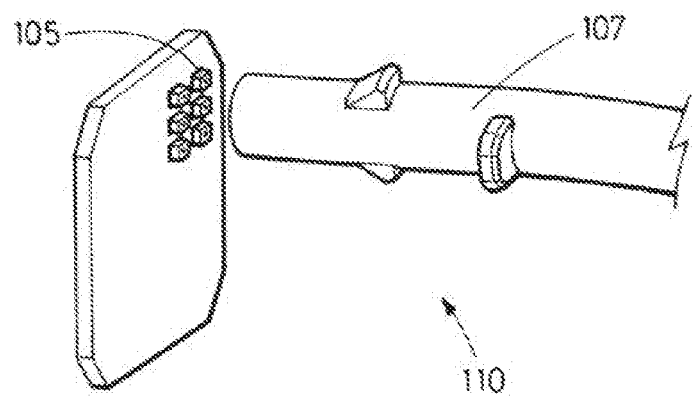
FIG. 1 shows a lighting device as in the state of the art.

The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

FIG. 1 shows a lighting device 110 as in the state of the art. This lighting device 110 comprises a first group of light sources 105. Each light source is installed in a light source connection, but as they are hidden by the light sources, they are not shown in this figure. The light produced by these light sources 105 is received by a light guide 107 which shapes the light received into a light pattern projected outside the lighting device 110.

Figure 2:
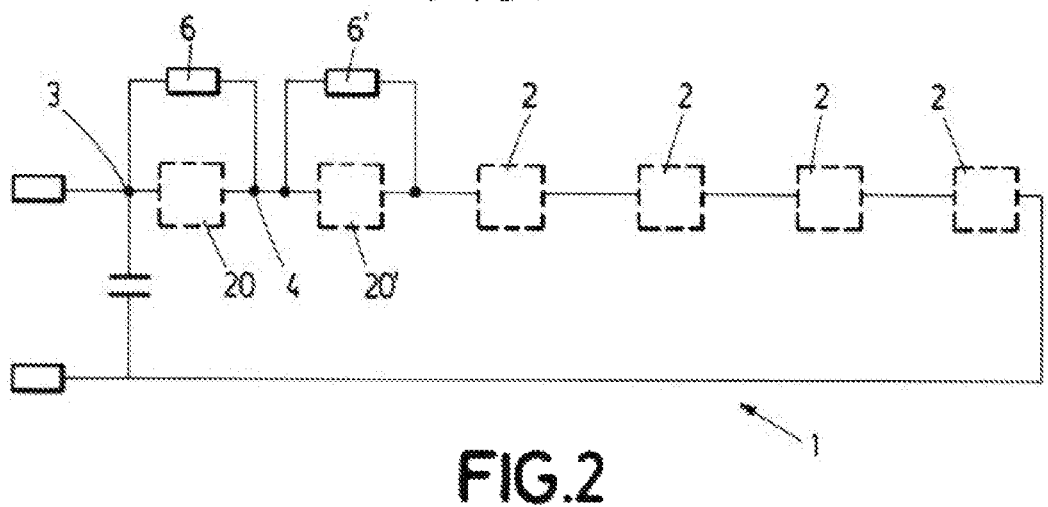
FIG. 2 shows the electric scheme of an electronic assembly according to the invention.

FIG. 2 shows the electric scheme of an electronic assembly 1 according to the invention. This electronic assembly 1 comprises a first group of light source connections 2. Each light source connection 2 comprises a first terminal 3 and a second terminal 4 and being suitable for receiving a light source. This first group of light source connections is similar to the light source connections shown in FIG. 1, but in this invention, two of the light source connections 2 are spare light source connections 20, 20'. As may be seen in this embodiment, the light source connections are connected in series.

The difference between the spare light source connections 20, 20' and the rest of the light source connections is based on that the electronic assembly further comprises two jumpers 6, 6', each of them in turn comprising a conductive element arranged to bypass one of the spare light source connections 20, 20' by putting the first and second terminals 3, 4 of the respective spare light source connection 20, 20' in electric contact. As a consequence, when in operation, none of the spare light source connections 20, 20' is fed by any current and, accordingly, none of them receive any light source.

The reason for this design is that the original electronic assembly may be designed for light sources are used for the same lighting function and which provide, considered in total, a predetermined flux, but different light sources providing greater flux may replace the first group of light sources, and then the jumpers are used for bypassing one or more of the spare light source connections, because the new light sources may provide the required flux without the need of installing a light source in at least one of the spare light source connections. As all of the light sources belong to the same bin, or at least produce a luminous flux, in operation conditions, which is comprised between 900 and 950 lm, they do not need a bin resistor.

Figure 3:
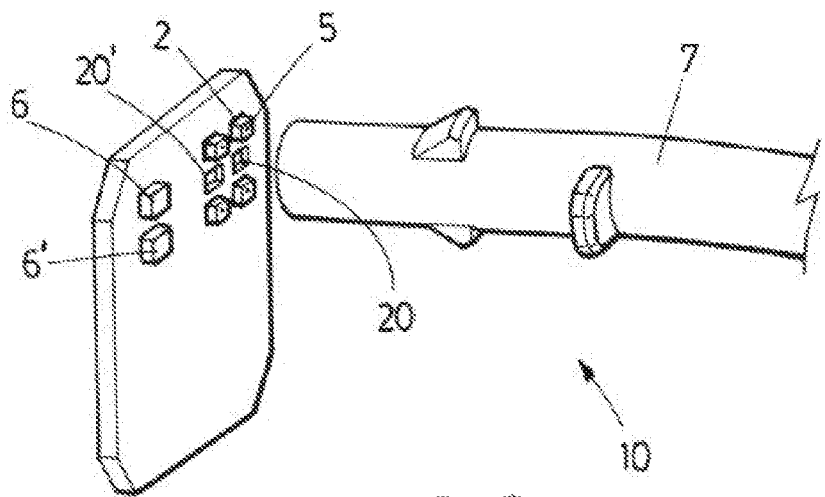
FIG. 3 shows a particular embodiment of a lighting device according to the invention.

FIG. 3 shows a lighting device 10 according to the invention, which includes the electronic assembly 1 which has been schematically represented in FIG. 2. In this lighting device 10, light emitting diodes (LEDs) 5 have been installed in the light source connections 2, but no LED is installed in any of the spare light source connections 20, 20'. In other embodiments comprised in the invention, only one spare light source connection is left without a LED.

In this embodiment, the first group of light source connections are physically arranged in a matrix arrangement, so that the LEDs provide a common flux, suitable for providing a turning indicator functionality.

The light emitted by the LEDs 5 is received by a light guide 7 and shaped into a light pattern projected outside the lighting device 1.

Figure 4:
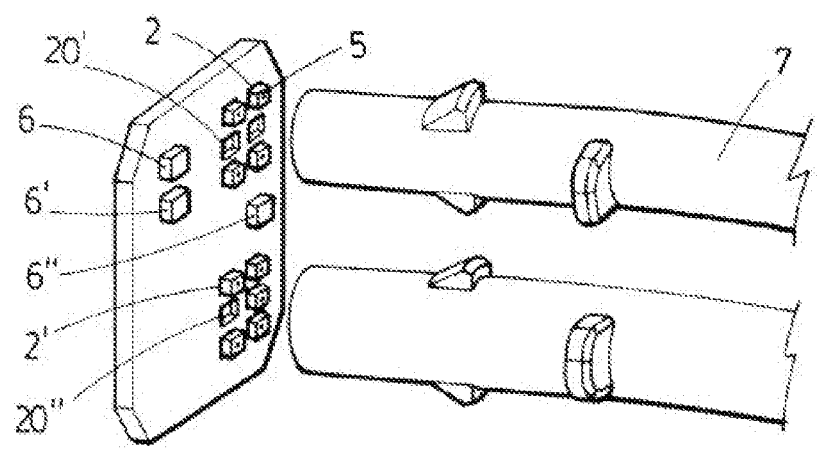
FIG. 4 shows a different embodiment of a lighting device according to the invention

FIG. 4 shows a different embodiment of a lighting device according to the present invention where, further from the first group of light source connections, there is a second group of light source connections 2', intended to provide a different functionality, such as a daily running light (DRL). This lighting device comprises a third jumper 6" arranged to bypass a third spare light source connection 20" belonging to the second group of light source connections.

Figure 5A:
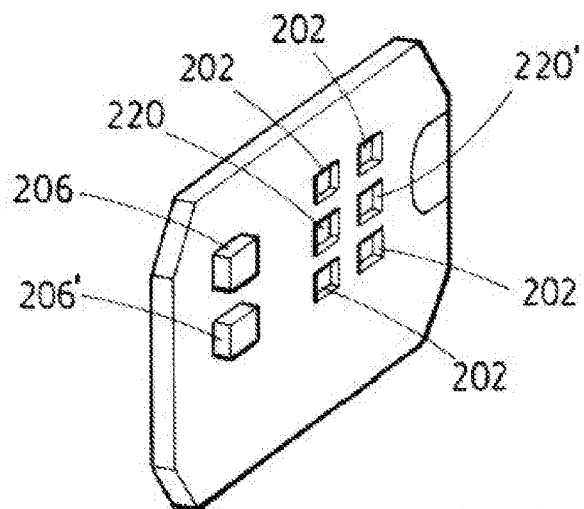
FIGS. 5a and 5b show the steps of a method for manufacturing a lighting device according to the invention.
Figure 5B:
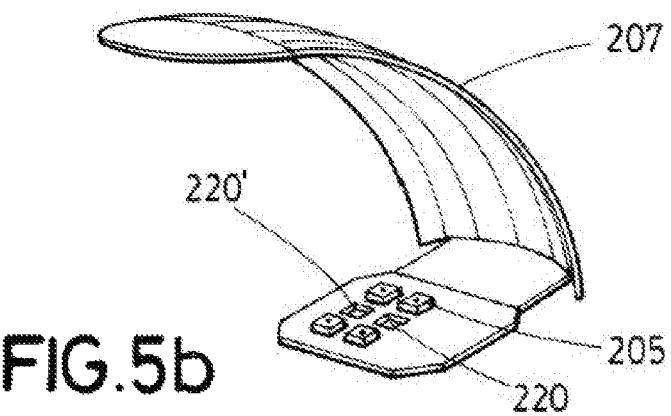

FIGS. 5a and 5b show the steps of a method for manufacturing a lighting device according to the invention.

A functionality is determined, and a predetermined amount of flux is required for this functionality. A predetermined flux bin is also chosen, so that the number of LEDs belonging to this predetermined flux bin to provide the required flux amount may be calculated. In this particular example, four LEDs are enough to provide the required flux.

In a lighting device 201 as shown in FIG. 5a, there are six light source connections 202, but two of them are spare light source connections 220, 220', and have a jumper 206, 206'. These jumpers are used to bypass the spare light source connections 220, 220'.

FIG. 5b shows a lighting device where four LEDs 205 have been installed in four of the light source connections, while the spare light source connections 220, 220' have been left without any LED. The jumpers bypass the connections of these spare light source connections so that the lighting device works properly. The four LEDs provide the flux required for this lighting functionality, and a reflector 207 receives this light and shapes it into a light pattern projected outside the lighting device 201.

What is claimed is:

1. An electronic assembly of an automotive lighting device, the electronic assembly comprising
    a first group of light source connections, where each light source connection associated with the first group comprises a first terminal and a second terminal each being suitable for receiving a light source, wherein at least one of the light source connections of the first group is a first spare light source connection;
    at least one jumper, where each jumper comprises a conductive element arranged to bypass the first spare light source connection by putting a first and a second terminal of the first spare light source connection in electrical contact, the first spare light source connection being deprived of any light sources; wherein the first group of light source connections are designed to receive light sources that are used for the same lighting function.

2. The electronic assembly according to claim 1, wherein the first group of light source connections are physically arranged in a matrix arrangement.

3. The electronic assembly according to claim 1, wherein the first group of light source connections are connected in a series arrangement.

4. The electronic assembly according to claim 1, wherein the first group of light source connections further comprises a second spare light source connection (20') and where the electronic assembly also comprises a second jumper (6'), the second jumper (6') comprising a conductive element arranged to bypass the second spare light source connection (20') by putting the first and second terminals of the second spare light source connection in electrical contact.

5. The electronic assembly according to claim 1, further comprising a second group of light source connections (2'), with a third jumper (6")arranged to bypass a third spare light source connection (20") belonging to the second group of light source connections.

6. The electronic assembly according to claim 1, which is deprived of a binning resistor.

7. The electronic assembly according to claim 1, wherein the light sources are solid-state light sources.

8. A lighting device comprising the electronic assembly according to claim 1; and a plurality of light sources installed in some of the light source connections of the first group of light source connections.

9. The lighting devices according to claim 8, further comprising a first optical element arranged to receive light from the plurality of light sources that is configured to shape the light into a light pattern projected outside the lighting device.

10. The lighting device according to claim 9, wherein the optical element is at least one of a lens, a light guide, a reflector or a collimator.

11. The lighting device according to claim 8, wherein all the light sources installed in light source connections of the first group belong to the same flux bin or where all the light sources produce a luminous flux, in operation conditions, which is comprised between two values l1 and l2, in such a way that l2 is greater than l1 but lower than 1.1 times l1.

12. The lighting device according to claim 8, the lighting device being a fog lamp, a turning indicator, a low beam headlamp, a high beam headlamp, a cornering light, a fixed bending light or a daytime running lamp.

13. A method for manufacturing a lighting device according to claim 8, the method comprising
   the steps of choosing a predetermined flux bin;
   calculating a first number of light sources which are necessary to meet luminous requirements provided that all the light sources belong to the predetermined flux bin;
   manufacturing an electronic assembly according to claim 1, installing only the first number of light sources in light source connections of the first group and placing jumpers in the rest of the light source connections of the first group.

\* \* \* \* \*